US010962488B2

(12) United States Patent
Mai

(10) Patent No.: US 10,962,488 B2
(45) Date of Patent: Mar. 30, 2021

(54) INTEGRATED PROJECTION-SCHLIEREN OPTICAL SYSTEM

(71) Applicant: China North Standardization Center, Beijing (CN)

(72) Inventor: Lyubo Mai, Beijing (CN)

(73) Assignee: China North Standardization Center, Beijing (CN)

( * ) Notice: Subject to any disclaimer, the term of this patent is extended or adjusted under 35 U.S.C. 154(b) by 0 days.

(21) Appl. No.: 16/939,547

(22) Filed: Jul. 27, 2020

(65) Prior Publication Data
US 2020/0355624 A1 Nov. 12, 2020

Related U.S. Application Data

(63) Continuation of application No. PCT/CN2019/108499, filed on Sep. 27, 2019.

(30) Foreign Application Priority Data

Sep. 28, 2018 (CN) .......................... 201811138868.2

(51) Int. Cl.
*G01N 21/958* (2006.01)
*G02B 9/08* (2006.01)
*G02B 27/00* (2006.01)

(52) U.S. Cl.
CPC ............. *G01N 21/958* (2013.01); *G02B 9/08* (2013.01); *G02B 27/0025* (2013.01)

(58) Field of Classification Search
CPC .... G01N 21/958; G02B 27/0025; G02B 9/08; G01M 11/00
USPC ...................... 356/239.1–239.8, 237.1–237.6
See application file for complete search history.

(56) References Cited

U.S. PATENT DOCUMENTS 5,560,697 A  10/1996  Lim et al.

FOREIGN PATENT DOCUMENTS

| CN | 201477055 U | 5/2010 |
| CN | 201754206 U | 3/2011 |
| CN | 202548427 U | 11/2012 |
| CN | 102841452 A | 12/2012 |
| CN | 103884486 A | 6/2014 |
| CN | 108226188 A | 6/2018 |
| CN | 109141835 A | 1/2019 |
| JP | 2011203273 A | 10/2011 |

*Primary Examiner* — Tri T Ton

(57) ABSTRACT

The present invention relates to projection and schlieren optical measurement technology, and more particularly to an integrated projection-schlieren optical system. The system includes a parallel light source system, a first positive lens, a diaphragm, a second positive lens, an image sensor, a negative lens, a knife edge device and a sample stage. In the system, a projection telescopic optical system and a schlieren camera optical system are respectively formed through the combination of optical characteristics of two movable lenses, enabling the integration functions of the projection optical system and the schlieren optical system.

9 Claims, 4 Drawing Sheets

INTEGRATED PROJECTION-SCHLIEREN OPTICAL SYSTEM

CROSS-REFERENCE TO RELATED APPLICATIONS

This application is a continuation of International Application No. PCT/CN2019/108499 with a filing date of Sep. 27, 2019, designating the United States, now pending, and further claims the benefit of priority from Chinese Application No. 201811138868.2 with a filing date of Sep. 28, 2018. The content of the aforementioned applications, including any intervening amendments thereto, is incorporated herein by reference in its entirety.

TECHNICAL FIELD

The present application relates to projection and schlieren optical measurement technology, and more particularly to an integrated projection-schlieren optical system.

BACKGROUND OF THE INVENTION

Striae, whether in visible-light optical materials or infrared optical materials, show adverse effects on the imaging quality of optical components. The material defect is generally qualitatively measured using a projection measurement apparatus, and for the purpose of detailed analysis, a schlieren measurement apparatus is further employed to perform a semi-quantitative measurement. The above two apparatuses have different optical principles, where the projection measurement apparatus adopts the principle of a telescopic optical system or parallel light, as shown in FIG. 1A and FIG. 1B; and the schlieren measurement apparatus adopts the principle of a camera optical system, as shown in FIG. 2. Therefore, the projection measurement apparatus and the schlieren measurement apparatus need to be designed separately. The two kinds of apparatuses are required in the measurement of the striae in optical materials with different purposes.

Given the above, it is necessary to have both the projection measurement apparatus and the schlieren measurement apparatus for the qualification and semi-quantification measurements of the striae in optical materials. However, this will lead to high cost and occupy more space for the apparatuses, and the operation is complicated and time-consuming.

SUMMARY OF THE INVENTION

An object of the invention is to create an integrated projection-schlieren optical system to reduce the resource waste and high cost derived from the separate design and manufacture of the projection optical apparatus and schlieren optical apparatus and optimize the space occupying for equipment.

The technical solutions of the invention are described as follows.

The present invention provides an integrated projection-schlieren optical system, comprising:

a parallel light source system, a first positive lens, a diaphragm, a second positive lens, an image sensor, a negative lens, a knife edge device and a sample stage;

wherein a uniformity of parallel light emitted by the parallel light source system is higher than a mean threshold; a spectrum of the parallel light source system is within a transparent spectrum of a measurement sample and also within a response spectrum of the image sensor;

when the integrated projection-schlieren optical system is used as a projection measurement apparatus, the parallel light source system, the sample stage, the first positive lens, the diaphragm, the second positive lens and the image sensor are sequentially placed along the direction of an optical axis; the measurement sample is placed on the sample stage; the diaphragm is a variable aperture diaphragm; the measurement sample placed on the sample stage is irradiated by the parallel light of the parallel light source system; the diaphragm is placed at a rear focal point of the first positive lens; an object focal point of the second positive lens coincides with the rear focal point of the first positive lens, thereby forming a telescopic optical system capable of compressing an incident parallel light into an emergent parallel light with a diameter smaller than the incident parallel light according to a telescope system magnification thereof; the telescopic optical system emits the compressed emergent parallel light onto the image sensor; an emergent parallel light aperture of the telescopic optical system is matched to an effective detection area of the image sensor in two dimensions; a focal length of the first positive lens is larger than that of the second positive lens, and a clear aperture of the first positive lens is larger than that of the second positive lens;

when the integrated projection-schlieren optical system is used as a schlieren measurement apparatus, the diaphragm is removed to allow the first positive lens and the second positive lens to be close to each other to form a camera objective lens of a schlieren system; a focal length of the camera objective lens is a desired focal length for schlieren measurement; the camera objective lens combined by the two positive lenses moves as a whole to form an optical imaging relationship in which the camera objective lens images the defects in the measurement sample on the image sensor; a ratio of an object distance to an image distance of the camera objective lens is equal to a ratio of a clear aperture diameter of the measurement sample to an effective side length of the detective surface of the image sensor; during the measurement, the knife edge device is placed at a rear focal point of the camera objective lens, so that the knife edge device move in a direction perpendicular to the optical axis of the integrated projection-schlieren optical system for measurement.

In an embodiment, each of the first positive lens, the second positive lens and the negative lens is a lens assembly to reduce aberrations.

In an embodiment, the parallel light source system is provided with a narrow-spectrum light source.

In an embodiment, the integrated projection-schlieren optical system further comprises a data collecting, processing and displaying system for collecting, processing and displaying the data sensed by the image sensor.

In an embodiment, the data collecting, processing and displaying system is further used to qualitatively evaluate material defects of the measurement sample according to the number, area and gray level of the striae detected and collected therein.

In an embodiment, if a full-aperture measurement is performed on the measurement sample, the clear aperture diameter of the first positive lens is set to be larger than the full-aperture diameter of the measurement sample.

In an embodiment, when the integrated projection-schlieren optical system is used as the projection measurement apparatus, the second positive lens is replaced with the negative lens, and an object focal point of the negative leans coincides with a rear focal point of the second positive lens.

In an embodiment, when the integrated projection-schlieren optical system is used as the projection measurement apparatus, an emergent beam diameter D2 of the telescopic optical system is designed to be equal to the effective dimension S of the image sensor.

In an embodiment, an emergent beam diameter D2 of the telescopic optical system is calculated as follows: D2=kD1; wherein D1 is an incident beam diameter of the telescopic optical system; and k is a compression coefficient of the light beam aperture and is calculated as k=f2/f1, wherein f2 is the focal length of the second positive lens and f1 is the focal length of the first positive lens.

Compared to the prior art, the invention has the following beneficial effects.

The invention provides an integrated projection-schlieren optical system, in which a projection telescopic optical system and a schlieren photographic optical system are respectively formed through the combination of optical characteristics generated from movements of the two lenses, enabling the optical system of the invention to simultaneously have the functions of a projection optical system and a schlieren optical system. The invention integrates the two optical measurement apparatuses with different optical principles into one optical measurement apparatus, which not only greatly reduces the design and manufacture cost of the measurement apparatuses and the space occupied by the measurement apparatus, but also increases the functions of the measurement apparatus, facilitating the practical measurement operation.

DETAILED DESCRIPTION OF EMBODIMENTS

Figure 1A:
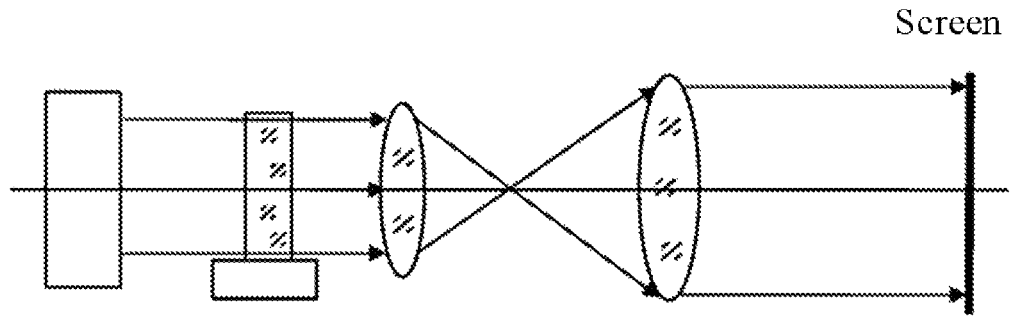
FIG. 1A and FIG. 1B show two kinds of projection optical systems in the prior art.

In order to make the objects, contents and advantages of the present invention clearer, the invention will be further described in detail below with reference to the accompanying drawings and embodiments.

The inventor of the present invention has found that, in an observation side (the right side in the drawings) of the measurement sample, a telescopic optical system and a camera optical system can be respectively formed by adjusting the spacing between the two lenses, thereby integrating the functions of the two optical systems into a measurement apparatus.

Based on the thorough understanding of the optical imaging principles of the projection optical system and the schlieren optical system, the present invention establishes an integrated projection-schlieren optical system by wisely utilizing the combination of two optical lenses.

Figure 3:
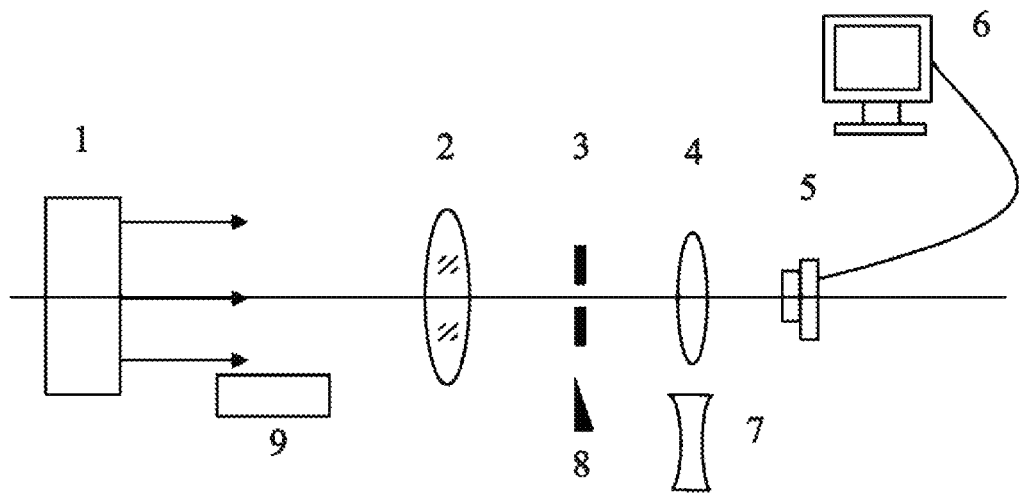
FIG. 3 shows an integrated projection-schlieren optical system of the present invention.

As shown in FIG. 3, the present invention provides an integrated projection-schlieren optical system, which includes a parallel light source system 1, a first positive lens 2, a diaphragm 3, a second positive lens 4, an image sensor 5, a data collecting, processing and displaying system 6, a negative lens 7, a knife edge device 8, and a sample stage 9. According to a requirement of an aberration, the first positive lens 2, the second positive lens 4 and the negative lens 7 may respectively be a lens set. A focal length of the first positive lens 2 is several times longer than that of the second positive lens 4, and an aperture diameter of the first positive lens 2 is also larger than that of the second positive lens 4.

The parallel light emitted from the parallel light source system 1 has a high uniformity (the uniformity of brightness should generally not be larger than 5%), where the better the uniformity of the light source is, the more accurate the measure results are, otherwise, the non-uniformity of the light source itself will be mistaken for the non-uniformity of the measurement sample, causing a large measure error and failing to accurately reflect the quality of the measurement sample.

The spectrum of the parallel light source system 1 should be within a transparent spectrum of the measurement sample and also within a response spectrum of the image sensor 5. The light source can be a broad-spectrum light source or a narrow-spectrum light source, where the measuring system with the narrow-spectrum light source is more accurate, but the luminous flux is required to be sufficiently large (an output power of the light source should be large) to enable the image sensor to make a response to the measurement sample with low-gray striae.

Figure 4:
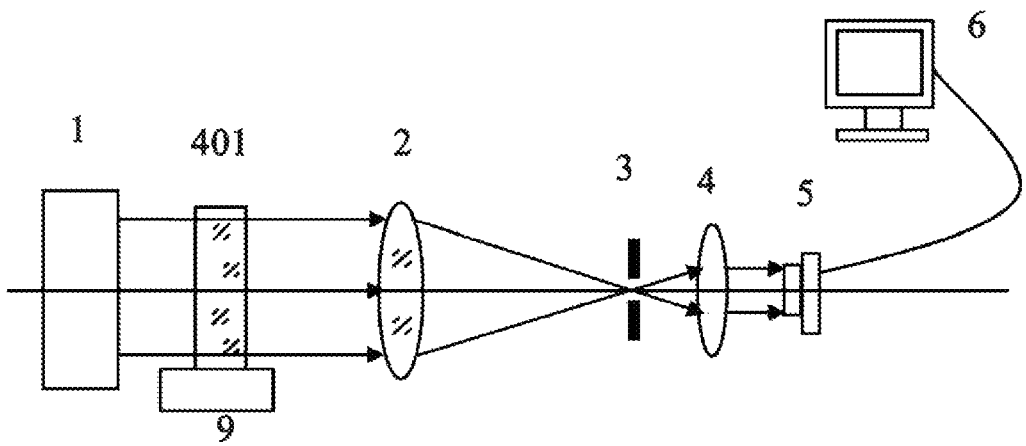
FIG. 4 shows the arrangement of a projection optical system according to the present invention.

As shown in FIG. 4, when the integrated projection-schlieren optical system is used as a projection measurement apparatus, the parallel light source system 1, the sample stage 9, the first positive lens 2, the diaphragm 3, the second positive lens 4 and the image sensor 5 are sequentially placed along the direction of an optical axis (from left to right). The measurement sample 401 is placed on the sample stage 9. The diaphragm 3 is a variable-aperture diaphragm. The measurement sample 401 placed on the sample stage 9 is irradiated by the parallel light source system 1. The diaphragm 3 is placed on a rear focal point of the first positive lens 2, and an object focal point of the second positive lens 4 coincides with the rear focal point of the first positive lens 2, thereby forming a telescopic optical system capable of compressing an incident parallel light into an emergent parallel light with a diameter smaller than the incident parallel light according to a magnification thereof; the telescopic optical system emits the compressed emergent parallel light onto the image sensor 5; a data collecting, processing and displaying system 6 is used to not only collect, process and display the data sensed by the image sensor 5, but also qualitatively evaluate material defects of the measurement sample according to the number, area and gray level of the striae detected and collected therein.

If a full-aperture measurement is performed on the measurement sample 401, the aperture diameter of the first positive lens 2 is required to be larger than the aperture diameter of the measurement sample 401.

Figure 1B:
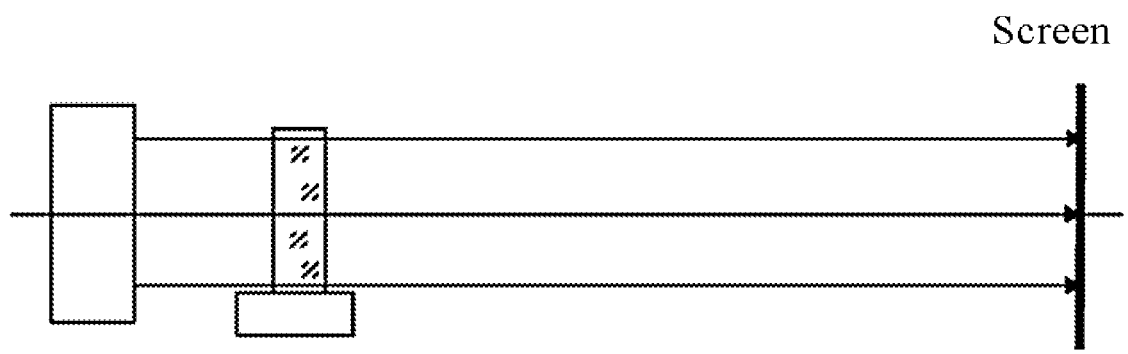
Figure 2:
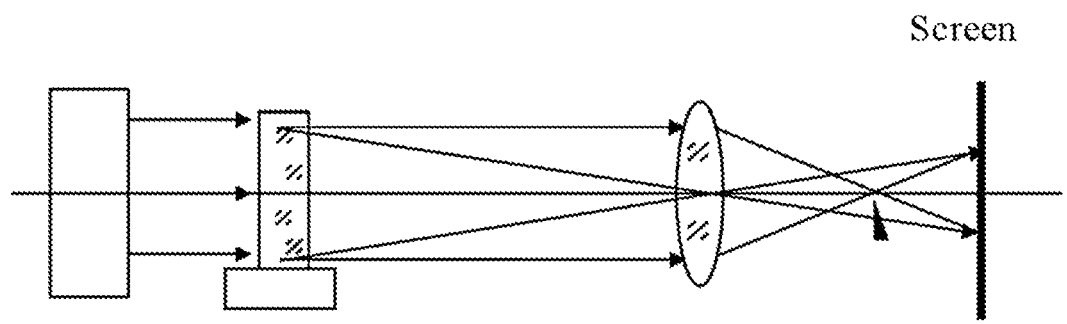
FIG. 2 shows a schlieren optical system in the prior art.

The integrated projection-schlieren optical system replaces a screen shown in FIG. 1A, FIG. 1B and FIG. 2 with the image sensor 5 to receive measure images, and uses the data collecting, processing and displaying system 6 to collect, process and display the measure images, so that the measure images of the measurement sample 401 can be stored and analyzed, which is beneficial to the data management of the measurement sample 401 and the accumulation of technical data.

Figure 5:
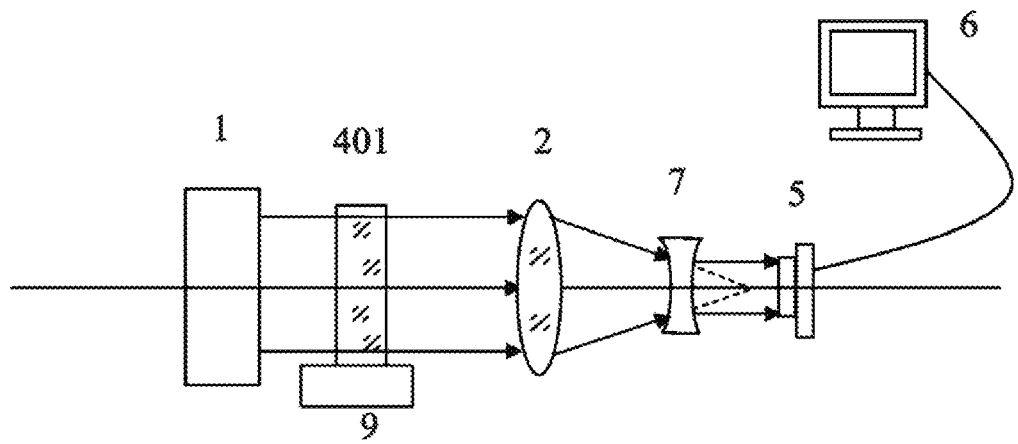
FIG. 5 shows the arrangement of another projection optical system according to the present invention.

The second positive lens 4 in FIG. 4 may also be replaced with the negative lens 7. At this time, the imaging relationship of the projection telescopic optical system is shown in FIG. 5. A rear focal point of the second positive lens 4 in FIG. 4 coincides with an object focal point of the negative lens 7 in FIG. 5. The projection optical system using a combination of the positive lens and the negative lens can reduce the space occupied by the measurement apparatus.

Figure 6:
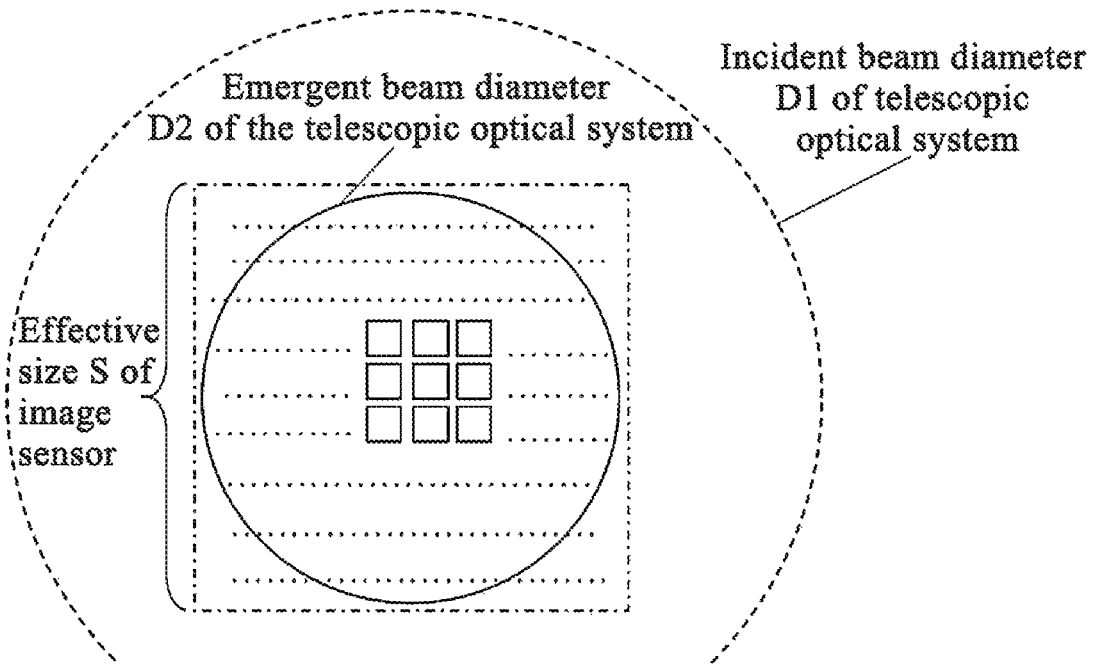
FIG. 6 schematically shows the matching relationship between an aperture of emergent parallel light of a telescopic optical system and an effective area of an image sensor in the projection optical system of the present invention.

As shown in FIG. 6, an emergent aperture of the telescopic optical system in FIGS. 4-5 should be matched to an effective detection area of the image sensor in two dimensions. The emergent beam diameter D2 of the telescopic optical system should be neither larger than an effective size S of the image sensor 5 nor smaller than the effective size S. If the emergent beam diameter D2 is larger than the effective size S, part of measure area of the measurement sample 401 will overflow, failing to overall analyze the defect status of the measurement sample; if smaller, the images of the measure area of the measurement sample 401 will be compressed excessively, so that details of the defects are difficult to distinguish.

The emergent beam diameter D2 of the telescopic optical system is calculated as follows: D2=kD1, where D1 is an incident beam diameter of the telescopic optical system; k is a compression coefficient of the light beam aperture, and calculated as follows: k=f2/f1, where f1 is the focal length of the first positive lens and f2 is the focal length of the second positive lens, wherein k is smaller than 1, or f1 is larger than f2.

Figure 7:
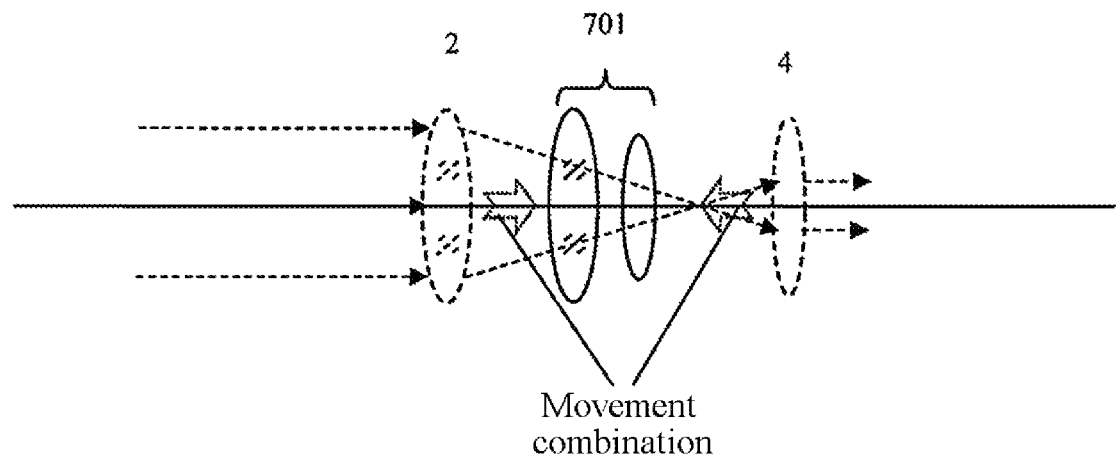
FIG. 7 schematically shows a forming relationship of the camera objective lens in a schlieren optical system according to the present invention.

As shown in FIG. 7, when the integrated projection-schlieren optical system is used as a schlieren measurement apparatus, the diaphragm 3 is removed to allow the first positive lens 2 and the second positive lens 4 in FIG. 4 to be close to each other to form a camera objective lens 701 of a schlieren system. In FIG. 7, the closer the first positive lens 2 and the second positive lens 4 are to each other, the shorter the focal length of the camera objective lens 701 constituted thereby is. The first positive lens 2 and the second positive lens 4 approach to each other until the focal length of the camera objective lens 701 reaches a desired focal length for the schlieren measurement system.

Figure 8:
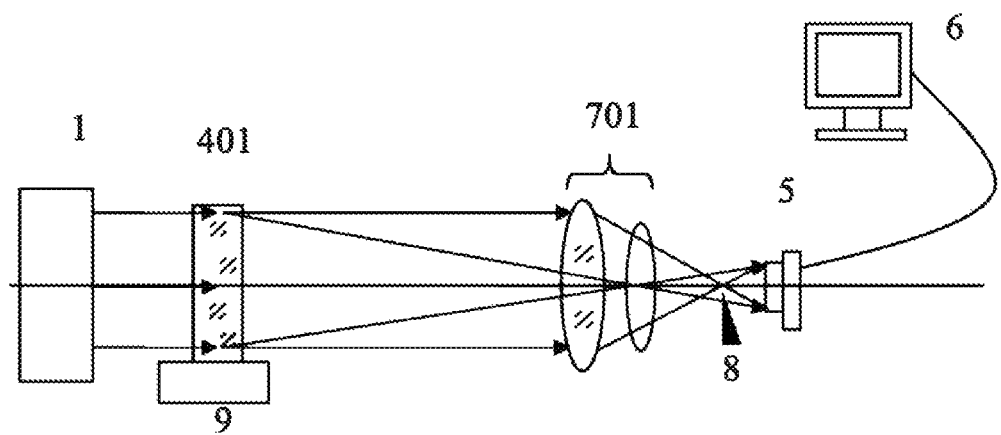
FIG. 8 shows the composition of the schlieren optical system according to the present invention.

The camera objective lens 701 formed by the first positive lens 2 and the second positive lens 4 moves as a whole (maintaining a constant combination relationship), to form an optical imaging relationship in which the camera objective lens 701 images the defects in the measurement sample 401 on the image sensor 5 (during the construction of the optical imaging relationship, positions of the measurement sample 401 and the image sensor 5 can be adjusted according to an imaging requirement). As shown in FIG. 8, a ratio of an object distance to an image distance of the camera objective lens 701 is equal to a ratio of the aperture diameter of the measurement sample 401 to the effective size of the image sensor 5. During the measurement, the knife edge device 8 is placed at a rear focal point of the camera objective lens 701 to allow the knife edge device 8 to move in a direction perpendicular to the optical axis for measurement.

With regard to the measurement of the refractive index uniformity of optical materials, the projection optical system is generally used to perform a rough measurement at first. When the refractive index uniformity of the measurement sample 401 approaches to the qualified boundary, the schlieren optical system is further required to perform a semi-quantitative measurement. In addition, the schlieren optical system is also required to analyze the refractive index uniformity of materials in detail. The invention integrates two kinds of optical measurement apparatuses established by two different optical principles into one apparatus, which not only greatly reduces the design and manufacture cost and the space occupied by two kinds of measurement apparatuses, but also increase the functions of the measurement apparatus, facilitating the practical operation.

The integrated projection-schlieren optical system of the present invention can be applied to not only the measurement of the striae in optical materials such as visible-light and infrared optical materials, but also the measurement of the uniformity of movement fields of gas or liquid. In addition, the invention simultaneously has the functions of the projection measurement apparatus and the schlieren measurement apparatus.

Described above is only a preferred embodiment of the present invention. It should be noted that any improvement and variation made by those skilled in the art without departing from the spirit of the present invention shall fall within the scope of the present invention defined by the appended claims.

What is claimed is:

1. An integrated projection-schlieren optical system, comprising:
a parallel light source system, a first positive lens, a diaphragm, a second positive lens, an image sensor, a negative lens, a knife edge device and a sample stage; wherein a uniformity of parallel light emitted by the parallel light source system is higher than a mean threshold; a spectrum of the parallel light source system is within a transparent spectrum of a measurement sample and within a response spectrum of the image sensor;
when the integrated projection-schlieren optical system is used as a projection measurement apparatus, the parallel light source system, the sample stage, the first positive lens, the diaphragm, the second positive lens and the image sensor are sequentially placed along the direction of an optical axis; the measurement sample is placed on the sample stage; the diaphragm is a variable aperture diaphragm; the measurement sample that is placed on the sample stage is irradiated by the parallel light of the parallel light source system; the diaphragm is placed at a rear focal point of the first positive lens; an object focal point of the second positive lens coincides with the rear focal point of the first positive lens, thereby forming a telescopic optical system capable of compressing an incident parallel light into an emergent parallel light with a diameter smaller than the incident parallel light according to a telescope system magnification thereof; the telescopic optical system emits the compressed emergent parallel light onto the image sensor; an emergent parallel light aperture of the telescopic optical system is matched to an effective detection area of the image sensor in two dimensions; a focal length of the first positive lens is larger than that of the second positive lens, and a clear aperture of the first positive lens is larger than that of the second positive lens;
when the integrated projection-schlieren optical system is used as a schlieren measurement apparatus, the diaphragm is removed so that the first positive lens and the second positive lens are close to each other to form a camera objective lens of a schlieren system; a focal length of the camera objective lens is a desired focal length for schlieren measurement; the camera objective lens combined by the two positive lens moves as a whole to form an optical imaging relationship in which the camera objective lens images the defect in the measurement sample on the image sensor; a ratio of an object distance to an image distance of the camera objective lens is equal to a ratio of a clear aperture diameter of the measurement sample to an effective side length of the detective surface of the image sensor; and during the measurement, the knife edge device is placed at a rear focal point of the camera objective lens, so that the knife edge device moves in a direction perpendicular to the optical axis of the integrated projection-schlieren optical system for measurement.

2. The integrated projection-schlieren optical system of claim 1, wherein each of the first positive lens, the second positive lens and the negative lens is a lens assembly to reduce aberrations.

3. The integrated projection-schlieren optical system of claim 1, wherein the parallel light source system is provided with a narrow-spectrum light source.

4. The integrated projection-schlieren optical system of claim 1, further comprising a data collecting, processing and displaying system for collecting, processing and displaying the data sensed by the image sensor.

5. The integrated projection-schlieren optical system of claim 4, wherein the data collecting, processing and displaying system is further used to qualitatively evaluate material defects of the measurement sample according to the number, area and gray level of the striae detected and collected therein.

6. The integrated projection-schlieren optical system of claim 1, wherein if a full aperture measurement is performed on the measurement sample, the clear aperture diameter of the first positive lens is set to be larger than the aperture diameter of the measurement sample.

7. The integrated projection-schlieren optical system of claim 1, wherein when the integrated projection-schlieren optical system is used as the projection measurement apparatus, the second positive lens is replaced with the negative lens, and an object focal point of the negative leans coincides with a rear focal point of the second positive lens.

8. The integrated projection-schlieren optical system of claim 1, wherein when the integrated projection-schlieren optical system is used as the projection measurement apparatus, an emergent beam diameter D2 of the telescopic optical system is designed to be equal to the effective dimension S of the image sensor.

9. The integrated projection-schlieren optical system of claim 1, wherein an emergent beam diameter D2 of the telescopic optical system is calculated according to $D2=kD1$;
wherein D1 is an incident beam diameter of the telescopic optical system; and k is a compression coefficient of the light beam aperture and is calculated as $k=f2/f1$, wherein f2 is the focal length of the second positive lens and f1 is the focal length of the first positive lens.

* * * * *